(12) United States Patent
Cohen

(10) Patent No.: US 6,501,739 B1
(45) Date of Patent: Dec. 31, 2002

(54) PARTICIPANT-CONTROLLED CONFERENCE CALLING SYSTEM

(75) Inventor: Alon Cohen, Rishon Lezion (IL)

(73) Assignee: Remoteability, Inc., Englewood Cliffs, NJ (US)

( * ) Notice: Subject to any disclaimer, the term of this patent is extended or adjusted under 35 U.S.C. 154(b) by 0 days.

(21) Appl. No.: 09/577,815

(22) Filed: May 25, 2000

(51) Int. Cl.[7] .............................................. H04Q 11/00
(52) U.S. Cl. .................. 370/260; 370/352; 379/202.01
(58) Field of Search ................................ 370/260, 265, 370/266, 267, 263, 352–356, 264–269; 379/201.03, 201.12, 221.02, 202.01, 204.01, 205.01, 221.03, 221.04, 207.11, 203.01, 206.01

(56) References Cited

U.S. PATENT DOCUMENTS

| | | | | |
|---|---|---|---|---|
| 5,434,860 A | * | 7/1995 | Riddle | 370/232 |
| 5,483,588 A | * | 1/1996 | Eaton et al. | 379/202.01 |
| 5,533,112 A | * | 7/1996 | Danneels | 379/202.01 |
| 5,539,741 A | * | 7/1996 | Barraclough et al. | 370/267 |
| 5,619,555 A | | 4/1997 | Fenton et al. | 379/88.11 |
| 5,734,724 A | | 3/1998 | Kinoshita et al. | 381/17 |
| 5,745,711 A | * | 4/1998 | Kitahara et al. | 345/759 |
| 5,844,979 A | * | 12/1998 | Raniere et al. | 379/202.01 |
| 5,852,656 A | * | 12/1998 | Sato et al. | 379/93.21 |
| 5,884,262 A | * | 3/1999 | Wise et al. | 704/270 |
| 5,916,302 A | * | 6/1999 | Dunn et al. | 709/204 |
| 6,007,228 A | * | 12/1999 | Agarwal et al. | 700/94 |
| 6,167,033 A | * | 12/2000 | Chang et al. | 370/263 |
| 6,175,619 B1 | | 1/2001 | Desimone | 379/202.01 |
| 6,240,070 B1 | * | 5/2001 | Kozdom et al. | 370/260 |

* cited by examiner

*Primary Examiner*—Melvin Marcelo
*Assistant Examiner*—Inder Pal Mehra
(74) *Attorney, Agent, or Firm*—Eitan, Pearl, Latzer & Cohen-Zedek (57) ABSTRACT

A communications system, which can be used within a conferencing communication system, is provided. The communications system includes at least one communications network, a plurality of communicators connectable to the at least one communications network, each of the communicators being operative to transmit, via the network, audio streams bound from any of the plurality of communicators, a plurality of mixers. Each of the mixer output associated with one of the communicators is operative to receive from the plurality of communicators a plurality of incoming streams bound from the communicators to the mixer and transmit any mixed combination of the incoming streams to the communicator associated with the mixer. The system also includes means for controlling any of the mixers to independently control a volume level of any of the incoming streams being mixed at any of the mixers to create the required mixed combination of the incoming streams.

61 Claims, 9 Drawing Sheets

PARTICIPANT-CONTROLLED CONFERENCE CALLING SYSTEM

FIELD OF THE INVENTION

The present invention is directed to conference calling and in particular to systems and methods for participant-controlled conference calling.

BACKGROUND OF THE INVENTION

In today's business world, conferencing and meetings involving multiple participants are commonplace. Moreover, business people are often forced to work in teams, as each team member brings a different skill to the team. This fact, coupled with the globalization of business, necessitates that communications systems be able to accommodate multiple participants who may be at different physical locations, far apart from one another.

Electronic mail, or e-mail, is one solution to this problem. E-mail messages may be sent to one, some, or all members in a work group, allowing the work group dynamic to be customized to the task at hand. However, not all participants read their e-mail diligently or in a timely fashion. This often results in delays, as e-mail messages flow back and forth without immediate responses. Also, the quality of e-mail-based multi-party collaboration may result in an inferior work product as people tend to express their thoughts better orally than through written communications, and because the number of e-mail messages increases exponentially as the number of work group participants increases, as does the time spent writing, sending, receiving, and reading e-mail messages.

Business telephone conference calling systems, including video conferencing systems, do not suffer from the communication delays inherent in e-mail systems, as the conferences are in real time. However, like Internet chat rooms, there are no provisions for selective filtering of incoming communications on a per-user basis within the context of the teleconference, particularly as all communications are managed by a common mixer. Thus all participants may speak at the same time and all participants hear all of what is being said. Should two or more participants wish to conference privately, they must invite each other in front of all other participants, and, thus, participants are sometimes hesitant to do this as this is impolite. Similarly, two participants who are in the same room and wish to talk privately must leave the telephone conference and speak outside the conference or outside the range of the telephone. Again, this may be seen as impolite.

What is needed is a telephone conferencing system that allows multiple parties to simulate a conference room or work group environment within which each party controls who they speak with and who they listen to while maintaining the cohesiveness of the group dynamic.

SUMMARY OF THE INVENTION

The present invention seeks to provide an improved conference calling system in which each participant may individually control incoming audio streams from other participants, and in which participants may communicate with each other within the context of the conference call with some or a full degree of privacy.

There is thus provided, in accordance with a preferred embodiment of the present invention, a conferencing communication system, which includes a telephone conference permitting at least one participant listening to the telephone conference and at least one additional audio source at a first volume level. The participant is operative to semi-detach from the telephone conference, either receive of initiate a call to an external party while still being able to hear the telephone conference at a second volume level, communicate with the external party at a third volume level, and upon disconnecting from the external party, re-attach to the telephone conference at any of the volume levels and a fourth volume level.

Furthermore, in accordance with a preferred embodiment of the present invention, the conferencing communication system includes a communications system.

In addition there is also provided, in accordance with a preferred embodiment of the present invention, a communications system, which includes at least one communications network; a plurality of communicators connectable to the at least one communications network, each of the communicators being operative to transmit, via the network, audio streams bound from any of the plurality of communicators; a plurality of mixers. Each of the mixer output associated with one of the communicators is operative to receive from the plurality of communicators a plurality of incoming streams bound from the communicators to the mixer and transmit any mixed combination of the incoming streams to the communicator associated with the mixer. The system also includes means for controlling any of the mixers to independently control a volume level of any of the incoming streams being mixed at any of the mixers to create the required mixed combination of the incoming streams.

Furthermore, in accordance with a preferred embodiment of the present invention, the communicators include means for independently controlling any of the mixers. The communicators may also be a second system.

Furthermore, in accordance with a preferred embodiment of the present invention, the communications system further includes a communications server. The server includes at least one interface to a communications network, the network being in communication with the communicators. The mixers are located within the server.

The communicators may also be a second system.

Furthermore, in accordance with a preferred embodiment of the present invention, the means for controlling is operative to control an associated mixer of a first of the communicators to control the volume level of the incoming streams such that the first communicator receives the output stream from the associated mixer, the output being a mix of incoming streams from a second of the communicators at a first volume level and all other of the incoming streams at a second volume level.

Furthermore, in accordance with a preferred embodiment of the present invention, the means for controlling is operative to control an associated mixer of a first of the communicators to control the volume level of the incoming streams such that the first communicator receives the output stream from the associated mixer, the output being a mix of incoming streams from a second of the communicators at a first volume level only.

Furthermore, in accordance with a preferred embodiment of the present invention, the means for controlling is operative to control any of the mixers to control the volume level of the incoming streams such that any other of the communicators other than the first and second communicators do not receive the incoming from the first and second communicators.

Furthermore, in accordance with a preferred embodiment of the present invention, the second communicator only receives the incoming stream from the first communicator.

Furthermore, in accordance with a preferred embodiment of the present invention, the means for controlling is operative to control any of the mixers to control the volume level of the incoming streams such that all of the communicators other than the second communicator receives the incoming streams from all of the communicators, and the second communicator only receives the incoming stream from the first communicator.

Furthermore, in accordance with a preferred embodiment of the present invention, the means for controlling is operative to connect any of the plurality of communicators to already connected communicators.

Furthermore, in accordance with a preferred embodiment of the present invention, the mixer is operative to control the volume level of at least one additional incoming stream, according to the input level of any other incoming streams bound for the mixer. The volume level is set to a first volume level in the absence of any other of the incoming streams bound for the mixer, and the volume level is set to a second volume level in the presence of any other of the incoming streams bound for the mixer.

Furthermore, in accordance with a preferred embodiment of the present invention, the mixer is operative to separate any of the input audio streams into a plurality of frequencies and independently control a volume level of any of the frequencies.

Furthermore, in accordance with a preferred embodiment of the present invention, the communications system further includes means for reestablishing a connection between one of the communicators connected to the system upon disconnection of the communicator from the system.

Furthermore, in accordance with a preferred embodiment of the present invention, the commutations system further includes means for reestablishing a connection between one of the communicators connected to the system upon disconnection of the communicator from the system, the means for reestablishing using a list of caller IDs associated with the user of the communicator, such that the list of IDs may contain the caller ID and communicator type last used by all user prior to the disconnection.

Furthermore, in accordance with a preferred embodiment of the present invention, any of the mixers is operative to receive a text message and further includes means for converting the text message to an audio message. Also, any of the mixers is operative to receive a pointer to a list consisting of sets including pairs of pre-set text messages, their corresponding audio and graphic representations, such that the pre-recorded message is sent to the communicator and corresponding text message is sent to the controlling means.

Further, any of the mixers is operative to receive a pointer to the list and further includes means for converting the pre-set text message to an audio message and for converting a text message from the controlling means to an audio message. Furthermore, any of the mixers further includes means for converting any of the audio streams into a text message.

Furthermore, in accordance with a preferred embodiment of the present invention, the means for controlling is operative to prevent an outgoing message from a first of the communicators from being received by any of the mixers. Further, the means for controlling is operative to prevent any of the incoming streams from being received by a first of the mixers, or prevent an outgoing message from a first of the communicators from being received by any of the mixers, and prevent any of the incoming streams from being received by a first of the mixers.

Furthermore, in accordance with a preferred embodiment of the present invention, the means for controlling is operative to prevent any of the communicators from receiving an in-band audio signaling tone sent by any of the communicators.

Furthermore, in accordance with a preferred embodiment of the present invention, any of the mixers is operative to retransmit any of the previously-transmitted streams, and/or to retransmit any of the previously-transmitted streams concurrent with the any of the mixers currently transmitting any of the streams not previously transmitted.

Furthermore, in accordance with a preferred embodiment of the present invention, any of the streams are transmitted via any one of a group including voice over IP (VoIP) system, voice over DSL (VoDSL) system and voice over data.

Furthermore, in accordance with a preferred embodiment of the present invention, the communicator is operative to cause the server to aurally provide an identification. The means for controlling is operative to provide the identification to the server upon entry of the identification at the means for controlling, and the server is operative to associate the communicator with the means for controlling using the identification.

Furthermore, in accordance with a preferred embodiment of the present invention, the means for controlling is operative to cause the server to provide an identification. In this case, the communicator is operative to provide the identification to the server upon entry of the identification at the communicators and the server is operative to associate the communicator with the means for controlling using the identification.

Furthermore, in accordance with a preferred embodiment of the present invention, the means for controlling is operative to cause the server to provide an identification. The means for controlling is operative to audibly provide in-band signals representing the identification to the communicator, the communicator is operative to provide the identification to the server, and the server is operative to associate the communicator with the means for controlling using the identification.

In addition, in accordance with a preferred embodiment of the present invention, the communications system further includes a plurality of microphones connected to one of the communicators, wherein at least one of the microphones is responsive to a far audio field and at least one of the microphones is responsive to a near audio field; and a plurality of Automatic Gain Controls (AGC) assembled with input circuitry of the communicator wherein each of the microphones is connected to a separate one of the AGCs, and wherein inputs from both microphones are added via one of the mixers to a microphone input of the communicator.

Alternatively, in accordance with a preferred embodiment of the present invention, the communications system further includes a plurality of microphones connected to one of the communicators, wherein at least two of the microphones receive audio input in a different frequency range, and wherein the means for controlling is operative to control the mixers to split the audio stream from the communicator into the different frequency ranges and control a volume level of each of the frequency ranges independently.

Furthermore, in accordance with a preferred embodiment of the present invention, the system farther includes indication means for either of vocally and visually indicating to each user the status of any of the participants. Any of the mixers is operative to retransmit any of the previously-transmitted streams at a first retransmission speed concurrently with a currently-transmitted stream at a different speed than the first transmission speed.

BRIEF DESCRIPTION OF DRAWINGS

The present invention will be understood and appreciated more fully from the following detailed description taken in conjunction with the appended drawings in which.

DETAILED DESCRIPTION OF PREFERRED EMBODIMENTS

Figure 1:
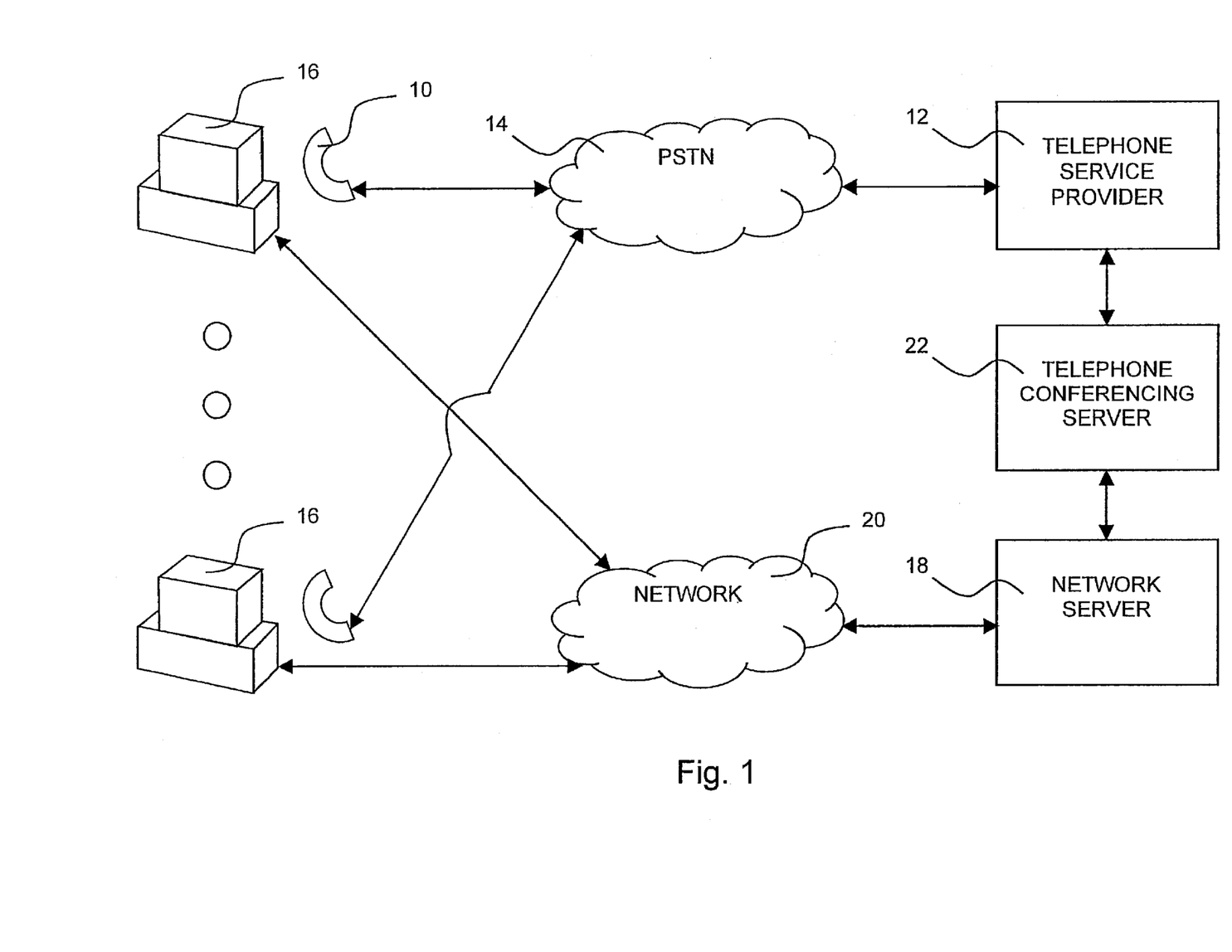
FIG. 1 is a simplified illustration of a participant-controlled conference calling system, constructed and operative in accordance with a preferred embodiment of the present invention.

Reference is now made to FIG. 1, which is a simplified illustration of a participant-controlled conference calling system, constructed and operative in accordance with a preferred embodiment of the present invention. In the system of FIG. 1 a number of conference participants, represented as communicators 10, are shown connected to a Telephone Conferencing Server 22 via a telephone service provider interface 12 and via a Public Switched Telephone Network (PSTN) 14. Communicators 10 provide audio stream from conference call participants via PSTN 14 that are received by the telephone service provider at telephone service provider interface 12, which may be any standard telephone service provider interface 12, and transferred to the Telephone Conferencing Server 22. Communicators 10 may be any commercially-available audio communications devices, such as, but not limited to, telephones and microphones. Each participant also preferably has a computer 16 that is connectable via a public data network 20, such as the Internet, via the Public Data Network Service Provider Interface 18 to a Telephone Conferencing Server 22. Computer 16 typically includes a user interface, such as a graphical user interface (GUI), a text entry interface, such as, but not limited to, a keyboard, a touch screen and/or a handwriting recognition device, and a pointing device, such as, but not limited to, a mouse or a pen and touch screen, that a conference participant may use to provide control messages from conference call participants via network 20 that are received by the public data network service provider at public data network service provider interface 18. Communications from participants received via telephone service provider interface 12 and public data network service provider interface 18 are forwarded to a conferencing server 22 where they are processed as described in greater detail hereinbelow.

Communicator 10 may be any known microphonic or telephonic equipment. Communicator 10 preferably has a high sampling rate and a wide audio bandwidth, such as a sampling rate of 16,000 samples per second resulting in an audio bandwidth of 300–7400 Hz using conventional coding technologies, or a CD-quality sampling rate of 40,000 samples per second with 16-bit linear coding resulting in an audio bandwidth of 20–18,000 Hz with 16 bits of dynamic range (or $2^{16}$) being the ratio between the smallest representable signal amplitude and the highest representable signal amplitude. Where heterogeneous communicators 10 are used the system typically translates all incoming audio qualities and coding formats to one common format and sampling rate using conventional signal processing algorithms for sample rate conversion and scaling. The common format may be different per communicator and will be determined by the communicator preferred format.

Figure 2:
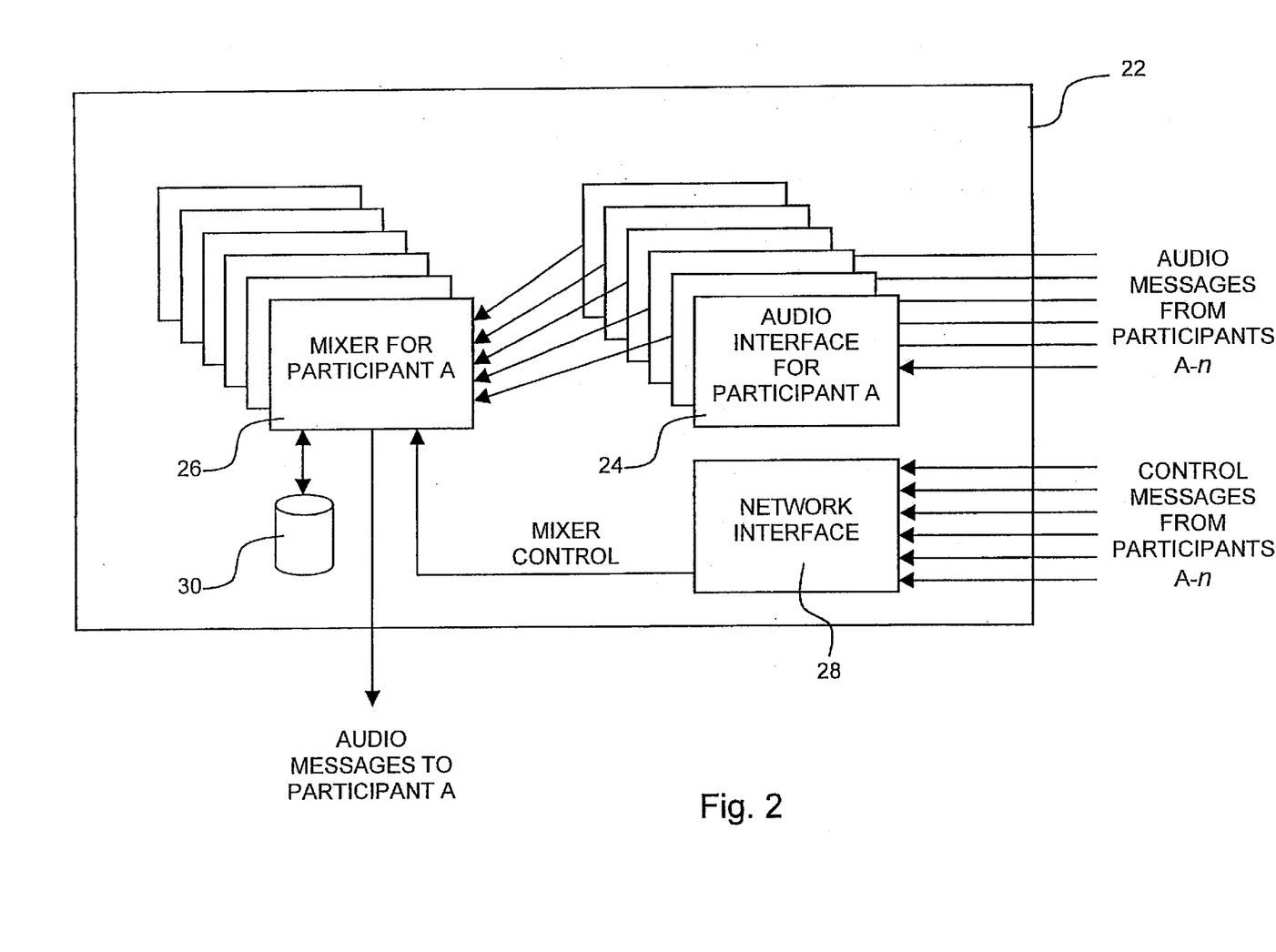
FIG. 2 is a simplified block diagram illustration of Telephone Conferencing Server 22 of FIG. 1, constructed and operative in accordance with a preferred embodiment of the present invention.

Reference is now made to FIG. 2, which is a simplified block diagram illustration of conferencing server 22 of FIG. 1, constructed and operative in accordance with a preferred embodiment of the present invention. Server 22 preferably comprises a plurality of audio interfaces 24, such as a D/160SC-LS, available from Dialogic, Inc., 1515 Route Ten, Parsippany, N.J., 07054, via which audio streams are received from the conference call participants, a plurality of mixers 26, such as a VND128, 128 Port Conferencing Bridge, available from Real Time Systems, Inc., 35640 Fremont Blvd., Suite 101, Fremont, Calif., 94536, to which the interfaces 24 forward the audio streams, and a network interface 28, which may be any standard network interface suitable for receiving control messages from the various participants by which the mixers 26 are controlled. Each audio interface 24 and mixer 26 is preferably adapted such that each communicator 10 provides audio input to one specific audio interface 24 and receives audio output from one specific mixer 26.

Server 22 may be any suitable computer hardware and software platform capable of supporting audio interface 24, mixer 26, and network interface 28, and controlling same via an appropriate processing architecture (not shown) using conventional techniques.

Each audio interface 24 preferably includes conventional hardware and/or software to support in-band signaling such as DTMF detection and generation as well as out-of-band signaling, echo cancellation, ring detection, and analog, digital, or voice over data network interfaces such as, but not limited to VoIP communications. DTMF may be used by a DTMF-equipped communicator 10 to provide command messages to server 22 via PSTN 14, thus providing a control channel in addition to or as an alternative to that provided by computer 16 via network 20.

Each mixer 26 preferably includes conventional hardware and/or software to support DTMF filtering as well as other in-band signaling if used in the system, as well as volume and mute control. Each mixer 26 preferably has at least one auxiliary input for mixing prerecorded messages or additional audio sources. These additional audio sources may be, for example, music or messages to be played when a participant is on hold, vocalized information, such as news, stock quotes, system messages, subliminal messages, etc., preferably selected by the participant to which the mixer is associated. It is appreciated that such auxiliary audio can be played during an ongoing conference call during an active or quiet period of the ongoing conference, and can be automatically activated and controlled by server 22 and/or be manually activated and controlled by each participant, such as by turning the volume down, by pausing and continuing any of the auxiliary inputs, change its playback speed preferably with pitch adjustment or by turning any of the auxiliary inputs off.

Server 22 is preferably capable of storing audio streams directed to it via Audio Interface 24 in a storage device 30 for later playback. Storage device 30 may be any conventional storage means, such as, but not limited to, a hard disk, digital audio tape (DAT), or compact disc, capable of having audio streams stored thereon and retrieved therefrom.

Each server 22 also preferably includes conventional hardware and/or software to support receiving text messages via network interface 28 and converting text messages into audio messages. Likewise, each server 22 also preferably includes conventional hardware and/or software to support convert audio messages into text messages or commands that may then be provided to conference participants via their computers 16 and/or via their communicators 10 using any conventional means, and/or used to control the mixer.

Figure 3:
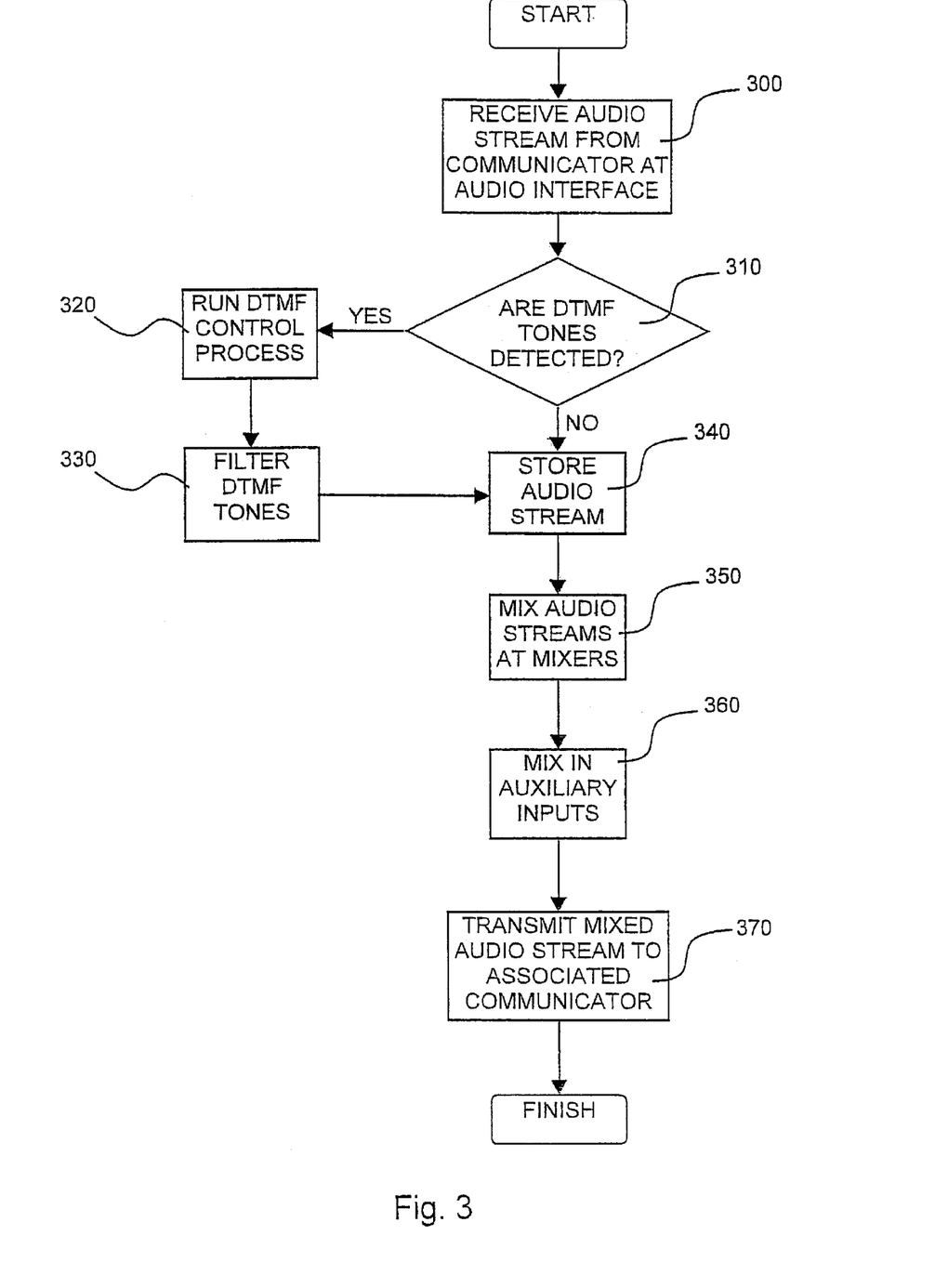
FIG. 3 is a simplified flowchart illustration of a method of operating the system of FIGS. 1 and 2 in accordance with a preferred embodiment of the present invention.

Reference is now made to FIG. 3, which is a simplified flowchart illustration of a method of operating the system of FIGS. 1 and 2 in accordance with a preferred embodiment of the present invention. In the method of FIG. 3 an audio stream from communicator 10 is received by a corresponding one of the audio interfaces 24 (step 300). The received audio stream is preferably analyzed using DTMF detection to check for the presence of DTMF tones or other in-band signaling tones (step 310). If DTMF or other signaling tones are detected, typically caused by a user pressing a key on a telephone that is being used as communicator 10, a control process is invoked to determine whether the DTMF tones represent a control message from the user (step 320). The DTMF tone is then preferably filtered out of the audio stream (step 330). The audio stream is optionally saved into an audio file on storage 30, typically as a cyclic audio file implementing any suitable conventional FIFO storage algorithm (step 340). This process is concurrently applied for all communicators 10 currently participating in a conference call.

The audio streams from any of the audio interfaces 24 are then preferably converted to a common audio format and mixed at mixers 26 (step 350). The selection of which audio streams are to be mixed at a particular mixer is preferably performed in accordance with control messages sent by the computer 16 that is pre-associated with the particular mixer. Likewise, auxillary inputs, such as prerecorded system messages and the like, may be obtained from storage 30, preferably along with a other corresponding relevant media type messages to fit all communicators and end points, or other sources, such as radio or text-to-speech, and mixed into the mixed audio stream at mixer 26 (step 360). The mixed audio stream is then transmitted to the communicator 10 that is pre-associated with the mixer 26 (step 370), while other corresponding media type messages are sent to matching end points, to effectively create a situation that the same message can be heard by a user using a communicator, and can be seen as text for example by someone using a computer terminal thus effectively achieving cross media messaging.

The system of FIGS. 1 and 2 is preferably configured to periodically determine the current state of each communicator 10 (i.e., each conference participant, with the understanding that a conference participant may have more than one communicator, such as one for each ear). Each conference participant typically indicates his current state by providing to conference server 22 a pre-defined DTMF tone via communicator 10 indicating a specific state and/or by sending a pre-defined control message from computer 16. Examples of current states may include ONLINE, indicating that a conference participant is in conference, BUSY, indicating that a conference participant is unable to talk but can listen, SLEEP, indicating that a conference participant elects not to participate, and STANDBY, indicating that a conference participant is not currently participating, but willing to be ONLINE. The system is preferably configured to indicate to each participant, vocally and/or visually by using the display on the computer 16, the status of the other participants. The system is also preferably configured to periodically determine the line status of each conference participant. Line statuses may include, but are not limited to, CONNECTED, NOT CONNECTED, IDLE or RINGING. Based on both the current status of the conference participant and the line status, a number of actions may be taken. If the conference participant is in the ONLINE state and his line status is NOT CONNECTED, then a connection may reinstated between the conference participant's communicator 10 and conferencing seer 22 using conventional techniques, such as dialing out in order to reconnect the conference participant. Otherwise, the conference participant is CONNECTED or RINGING, and thus need not be reconnected. If the conference participant's state is STANDBY and his line status is IDLE, the system will wait for the participant to call into the system, or for the participant's status to change by another participant or by an internal process, such as from STANDBY to ONLINE. If the conference participant's state is STANDBY and his line status is RINGING, conferencing server 22 may answer the call and may ask for the conference participant to provide his identification, typically by a entering a password via computer 16 or a DTMF code via communicator 10.

Conference participant states may be changed by the system or externally by other conference participants. For example, if the system maintains a schedule with respect to when to initiate a specific call to a conference participant, at the designated time the system may change the conference participant's state from STANDBY to ONLINE or from any other state to ONLINE, causing the system to establish a connection between the conference participant's communicator 10 and conferencing server 22. Alternately, if a conference participant A is standing by and is not connected, another conference participant B may choose to change the status of conference participant A to ONLINE, causing a connection to be established to conference participant A.

Figure 4:
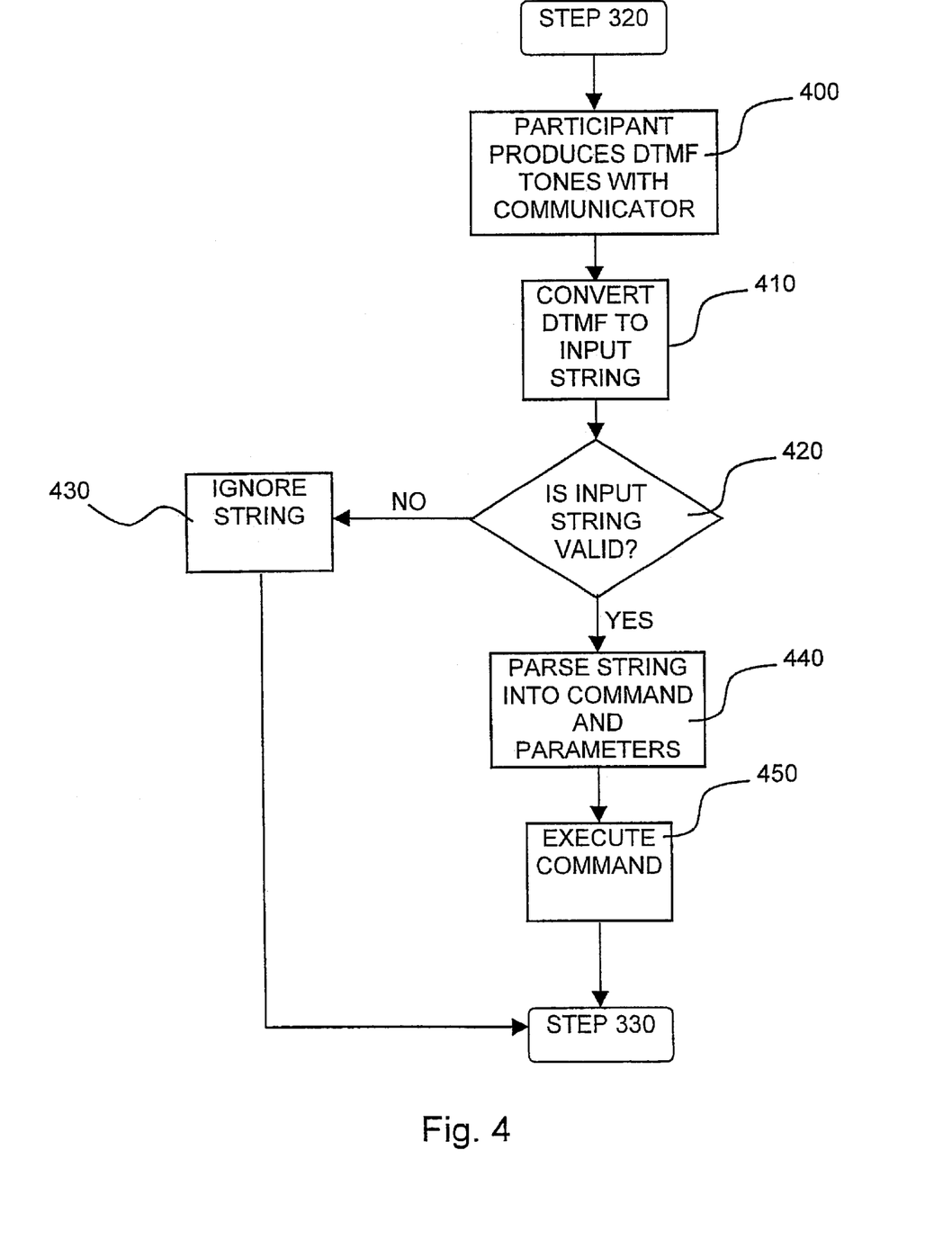
FIG. 4 is a simplified flowchart illustration of a method of implementing step 320 of FIG. 3 in accordance with a preferred embodiment of the present invention.

Reference is now made to FIG. 4, which is a simplified flowchart illustration of a method of implementing step 320 of FIG. 3 in accordance with a preferred embodiment of the present invention. In the method of FIG. 4 a conference participant presses a key on communicator 10, as described above, to produce a DTMF tone or series of tones (step 400). The DTMF is received by conferencing server 22 and converted to the actual symbols of the correspondingly pressed keys to form an input string (step 410). The input string is then compared to predefined valid strings maintained by conferencing server 22 to determine whether it is known or valid (step 420). If the string is unknown, invalid, or its input is not completed in a reasonable time (typically a few seconds) it is ignored (step 430).

If the string is valid, it is preferably parsed into specific command and parameters in accordance with a predefined algorithm (step 440). The commands are then executed using any relevant parameters (step 450). Preferably, commands may have multiple parameters, including parameters for identifying the communicator from which the command originated, for identifying a specific audio stream, the volume at which to set a specific audio source as it is mixed at mixer 26, or a master volume for all output from mixer 26. Some commands may contain as few as a single parameter identifying the conference participant that generated the DTMF tone.

Figure 5:
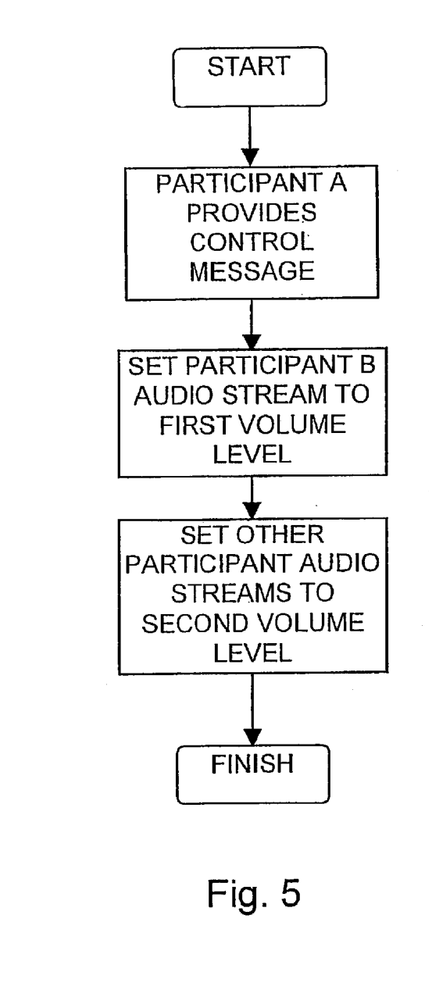
FIGS. 5–15 are a simplified flowchart illustrations of various methods of controlling mixer 26, operative in accordance with preferred embodiments of the present invention.

Reference is now made to FIG. 5, which is a simplified flowchart illustration of a method of controlling mixer 26, operative in accordance with a preferred embodiment of the present invention. In the method of FIG. 5 a conference participant A provides a control message to conferencing server 22 indicating that the input volume of the audio stream of a conference participant B to the mixer 26 associated with user A, should be set to a first volume level, while all other incoming audio streams, to that mixer, should be set to a second volume level.

Figure 6:
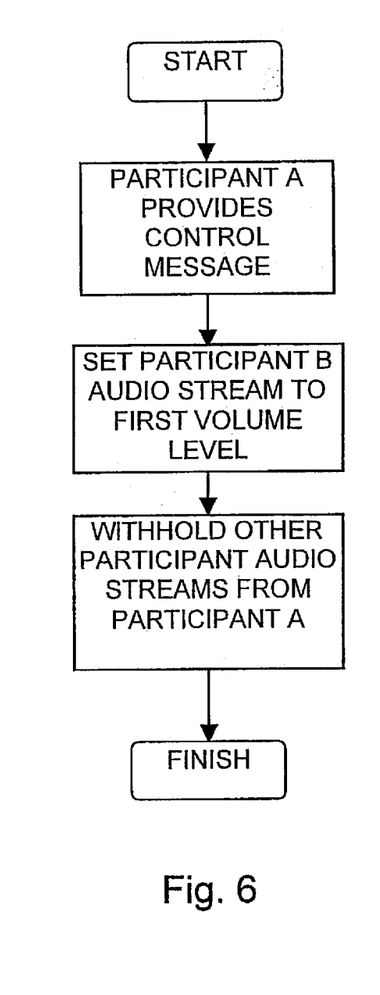

Reference is now made to FIG. 6, which is a simplified flowchart illustration of a method of controlling mixer 26, operative in accordance with a preferred embodiment of the present invention. In the method of FIG. 6 a conference participant A provides a control message to conferencing server 22 indicating that the input volume of the audio stream coming from a conference participant B to the mixer 26 associated with user A, should be set to a first volume level and that all other audio streams should not be sent to conference participant A.

Figure 7:
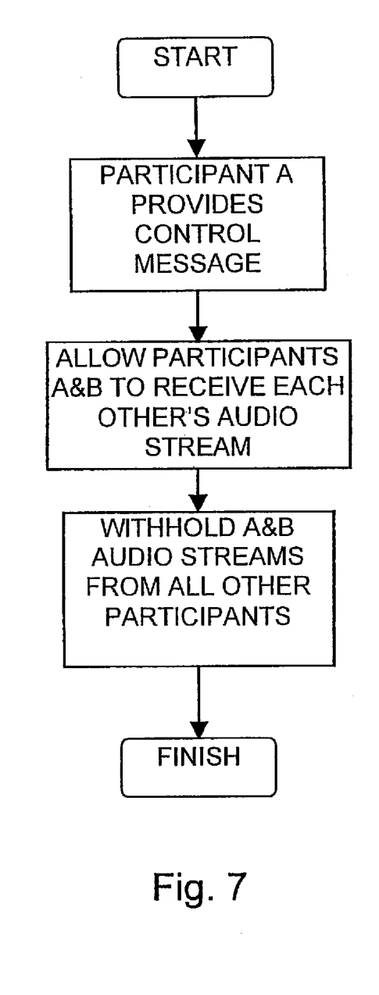

Reference is now made to FIG. 7, which is a simplified flowchart illustration of a method of controlling mixer 26, operative in accordance with a preferred embodiment of the present invention. In the method of FIG. 7 a conference participant A provides a control message to conferencing server 22 indicating that the input audio streams of conference participant A and of a conference participant B should not be mixed in at the mixers of any other conference participants other than at the mixers of conference participant A and B. Thus, A and B may have a private discussion without having to disconnect from the conference.

Figure 8:
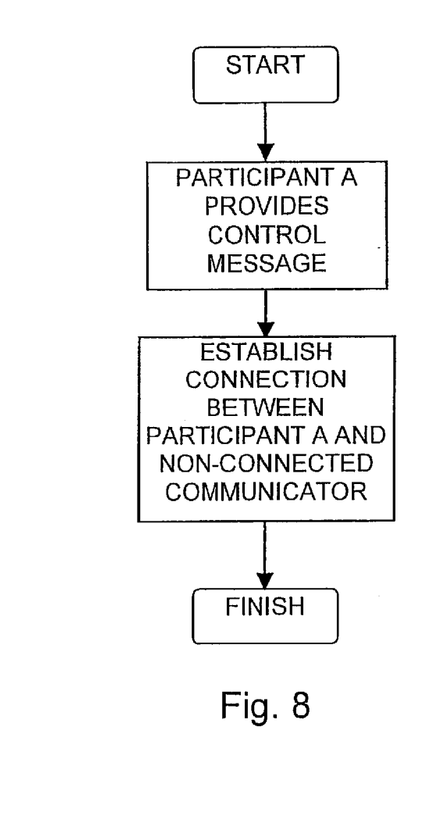

Reference is now made to FIG. 8, which is a simplified flowchart illustration of a method of controlling mixer 26, operative in accordance with a preferred embodiment of the present invention. In the method of FIG. 8 a conference participant A provides a control message to conferencing server 22 indicating that a connection should be established between conference participant A and another communicator 10 not currently connected to conferencing server 22. Thus, any conference participant may add new conference participants during an ongoing conference.

Figure 9:
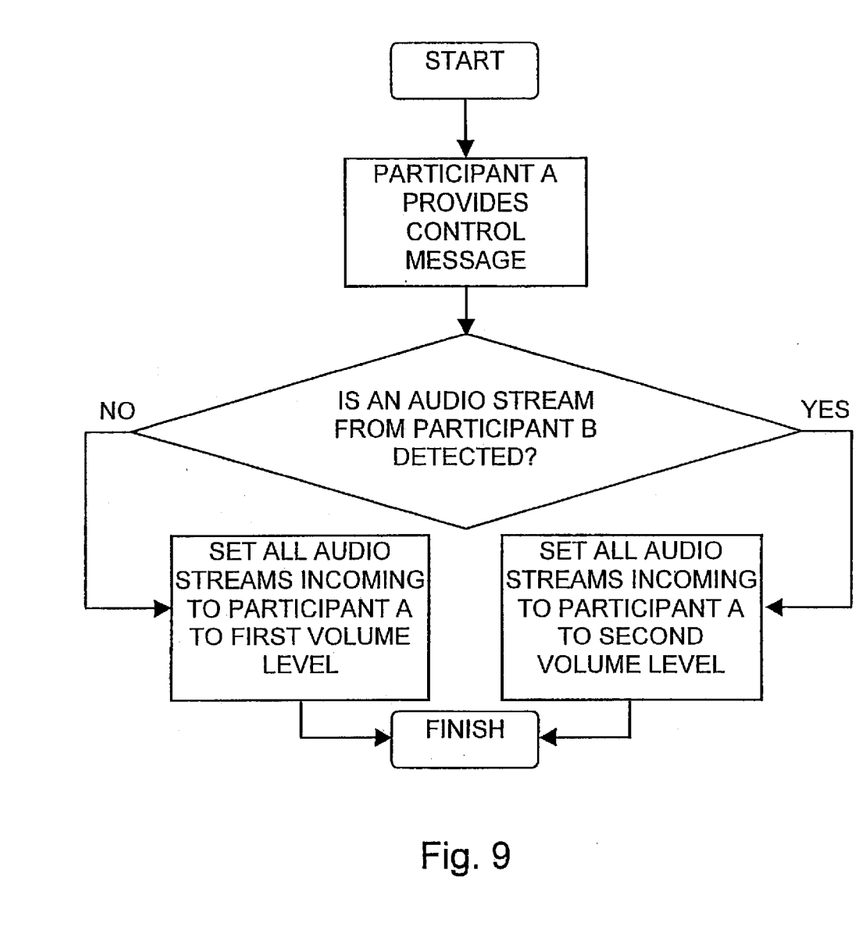

Reference is now made to FIG. 9, which is a simplified flowchart illustration of a method of controlling mixer 26, operative in accordance with a preferred embodiment of the present invention. In the method of FIG. 9 a conference participant A provides a control message to conferencing server 22 indicating that, until a different command is provided, audio streams sent by all conference participants to conference participant A be set to a first volume level in the absence of an audio stream from a conference participant B, and set to a second volume level in the presence of an audio stream from conference participant B to conference participant A. Thus, all audio may be played at a high volume until a conference participant B provides an audio stream, at which point the volume of all audio streams provided to the mixer of conference participant A is lowered to allow conference participant A to hear conference participant B at a higher volume.

Figure 10:
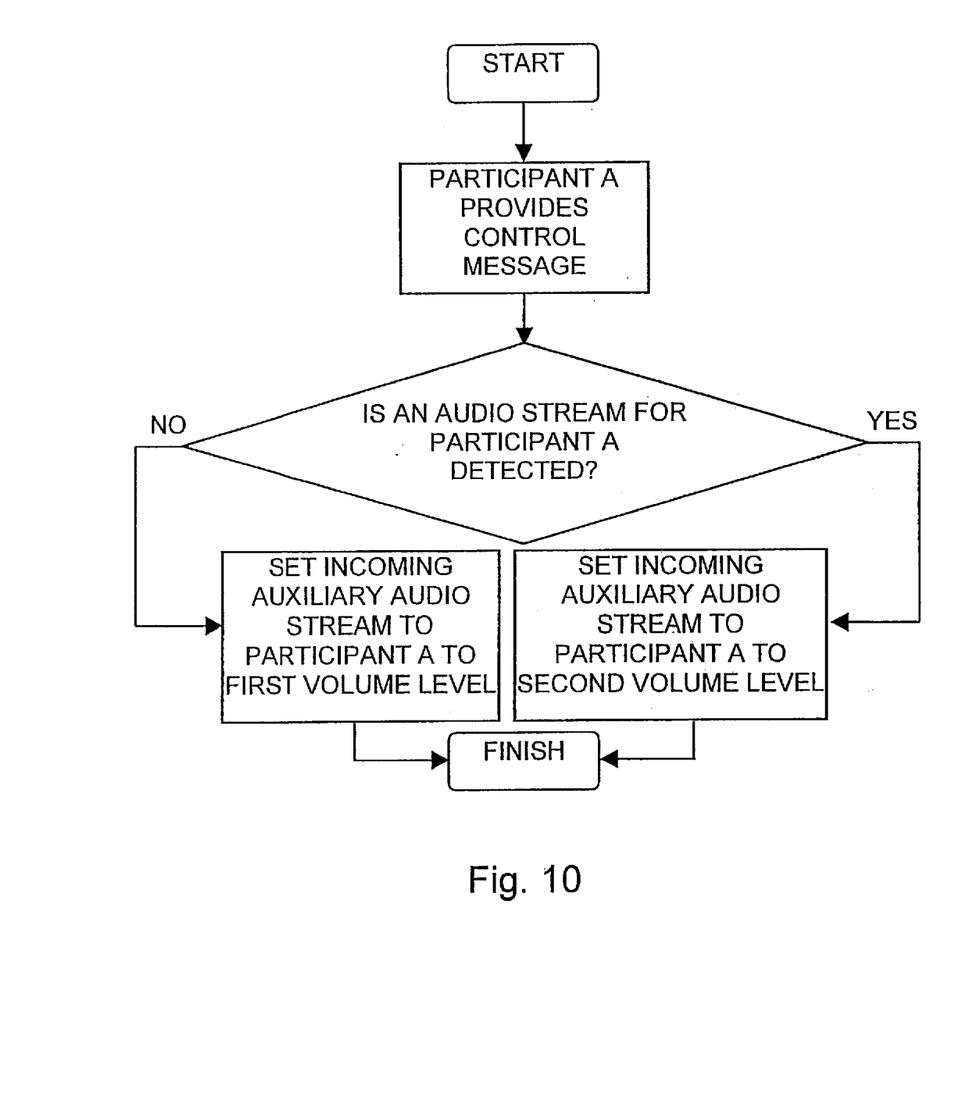

Reference is now made to FIG. 10, which is a simplified flowchart illustration of a method of controlling mixer 26, operative in accordance with a preferred embodiment of the present invention. In the method of FIG. 10 a conference participant A provides a control message to conferencing server 22 indicating that, until a different command is provided, audio streams sent by an auxiliary audio source to conference participant A be set to a first volume level in the absence of an audio stream from all other conference participant received by A's mixer, and set to a second volume level in the presence of an audio stream from at least one other conference participant received by A's mixer. Thus, participant A can listen to auxiliary audio at different volume levels during quite periods versus non-quite periods. The server may also pause the auxiliary audio source when not heard by the participant or when a participant so requests. The mixer may be implemented in two stages—a main stage oil the server and a final stage on the communicator for mixing pre-loaded content form a fixed or detachable memory on the communicator. When the server uses such two-stage mixing, the local mixer will interpret the user command and control the relative volume of the content and the audio stream provided from the first mixing stage on the server so that the content may be played or paused during quiet or non-quiet periods as explained above. It is important to note that in the present embodiment all mixers reside on the server. It is possible to locate mixers at any location in the network as well as on the end points or communicators. It is also important to note that mixers can be implements in a plurality of stages so that each stage mixes its input streams according to its control messages and sends the mixed input to another stage to be mixed with additional streams. The distribution of mixers enables system designer the flexibility to trade CPU power or scalability with network bandwidth required to carry additional information between the distributed mixers.

Figure 11:
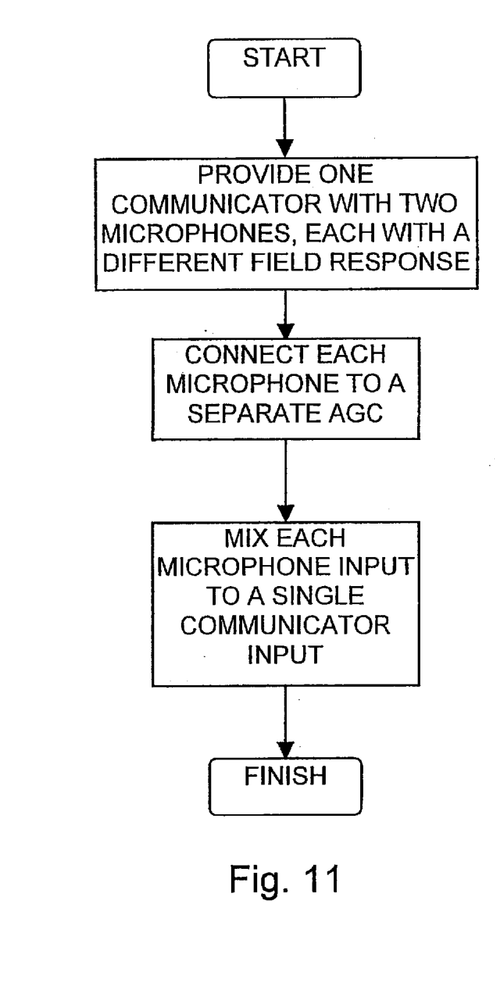

Reference is now made to FIG. 11, which is a simplified flowchart illustration of a method of connecting multiple microphones to a single communicator, where the microphones have different field responses. In the method of FIG. 11 one microphone is responsive to far audio field, and another microphone is responsive to near audio field. Each microphone is preferably connected to a separate Automatic Gain Control (AGC) arrangement incorporated into the input circuitry of the communicator. Inputs from both microphones are added via a single mixer to communicator 10's microphone input. Such an arrangement provides better audio sensitivity for a far-away speaker where a nearby speaker talks in a loud voice, and, conversely, reduces interference from background noise when a nearby speaker speaks softly.

Figure 12:
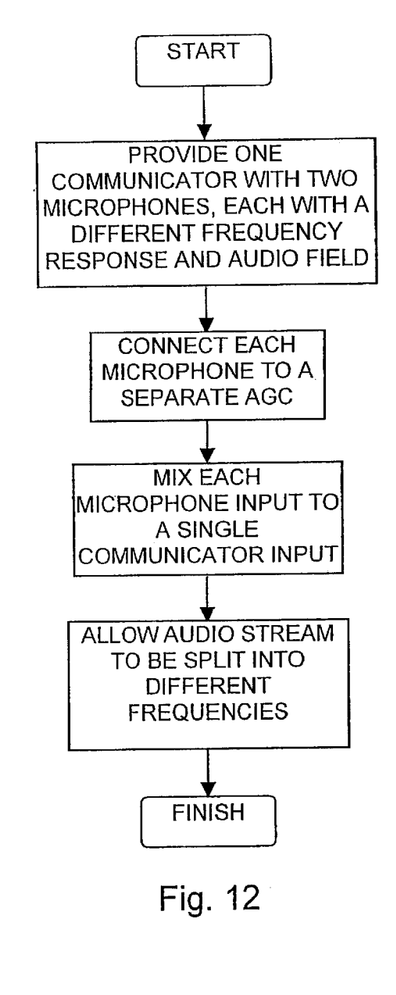

Reference is now made to FIG. 12, which is a simplified flowchart illustration of a method of controlling mixer 26, operative in accordance with a preferred embodiment of the present invention. In the method of FIG. 12 a conference participant A provides a control message to conferencing server 22 indicating hat an incoming audio stream should be split into a two or more frequency ranges, and that the volume of each frequency range may be independently controlled. Such an arrangement allows multiple microphones to be used with a single communicator 10, where each microphone is set to receive a specific frequency range and a different audio field (i.e., far away or close by). This arrangement will enable, for example, a participant A to select if only participant B is to be heard by participant A (e.g., in a low frequency range, for example 300 Hz–1500 Hz), or if participant B is to be heard by participant A together with background noise from participant B's surrounding environment (e.g., including a higher frequency range, for example 1500 Hz–3400 Hz) by adding second frequency range. Similarly, only the background noise may be selected to be received by participant A.

It is appreciated that the methods of FIGS. 11 and 12 may be combined by connecting multiple microphones with different field responses and different frequency responses to a separate per-microphone Automatic Gain Control (AGC) incorporated into the input circuitry of the communicator.

Figure 13:
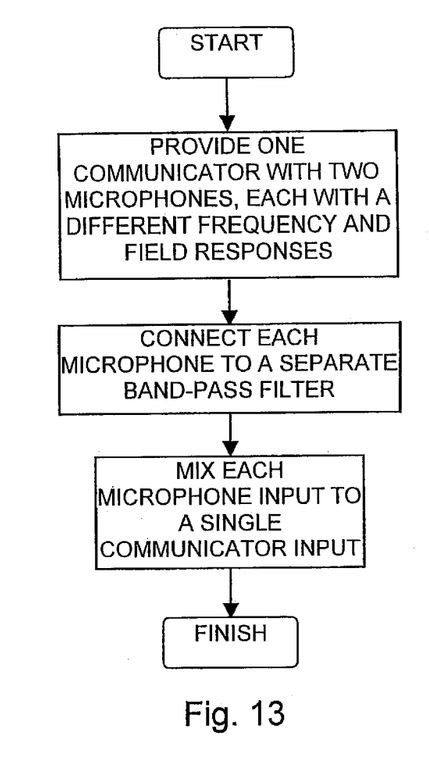

Reference is now made to FIG. 13, which is a simplified flowchart illustration of a method of connecting multiple microphones to a single communicator, where the microphones have different field responses and different frequency responses. In the method of FIG. 13 one microphone is responsive to far audio field, and another microphone is responsive to near audio field. Each microphone is preferably connected to a separate band-pass filter, and both are added via a single mixer to communicator 10's microphone input. Such an arrangement provides better audio sensitivity for a far-away speaker where a nearby speaker talks in a loud voice, and also allows the listener to shift its attention from the speaker itself to the sounds in the speaker's surroundings.

Figure 14:
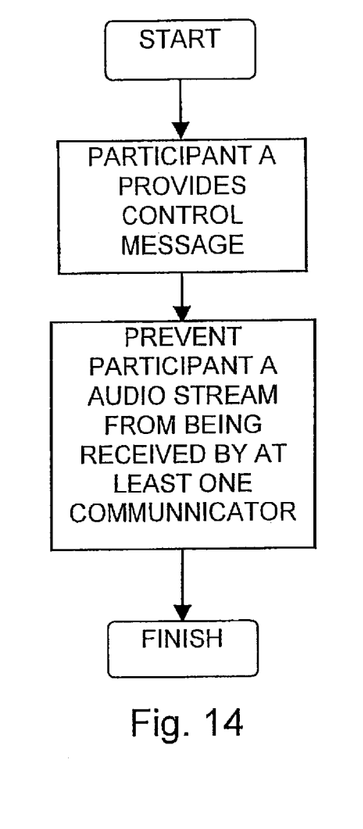

Reference is now made to FIG. 14, which is a simplified flowchart illustration of a method of controlling mixer 26, operative in accordance with a preferred embodiment of the present invention. In the method of FIG. 14 a conference participant A provides a control message to conferencing server 22 indicating that an outgoing audio stream from conference participant A should be prevented from being received by at least one other of said communicators. Thus, a whisper mode or a full-mute mode may be provided to a subset of the users.

Figure 15:
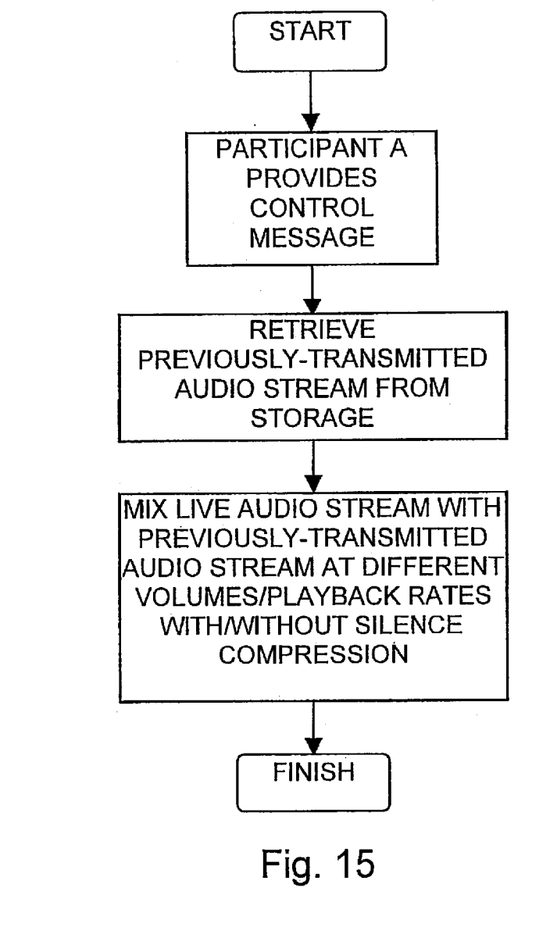

Reference is now made to FIG. 15, which is a simplified flowchart illustration of a method of controlling mixer 26, operative in accordance with a preferred embodiment of the present invention. In the method of FIG. 15 a conference participant A provides a control message to conferencing server 22 indicating that one or more audio streams previously-transmitted to conference participant A be retrieved from storage 30 and retransmitted to conference participant A. The retransmission may be done at a higher volume level (preferably user-defined per channel) than other currently-incoming audio streams, or all other audio streams may simply be muted. The last n minutes, hours, etc. of the audio stream to be retransmitted may also be specified. The storage used is preferably cyclic FIFO storage so that during delayed playback it may continuously fill with "live" information, enabling a participant to stay on a delayed listening mode indefinitely. Silence compression techniques and audio compression techniques are also preferably employed to reduce storage consumption, thus enabling a participant who listens to a delayed playback to skip silence periods and reduce time gaps between the delayed playback and the "live" conference. Skipping live periods can be performed only if all input-delayed playback channels are simultaneously silent. Additionally or alternatively, the gap between the delayed playback and the live audio stream may be closed by speeding up the playback and employing known signal processing methods of adjusting the peech (i.e., the base frequency of the speech) of the speeded up playback to its original frequency band.

Storage device 30 (FIG. 2) may be used to record any aspect of the activity of the system of FIGS. 1 and 2 as expressed by any of the methods described hereinabove. This activity information may be analyzed at any time to report a participant's activity and participation, and may be used in the development of incentive plans based on a participant's contribution to team work. For example, the amount of time a specific participant was muted by others relative to other team members may be measured and used to reduce the participant's incentive.

Referring again to FIGS. 1 and 2, when a call is initiated by communicator 10 the server 22 accepts controls for a specific mixer using DTMF tone generated by the user pressing keys on the communicator. When computer 16 is activated, the server associates communicator 10 and computer 16 with the same user. To accomplish this, the user may send a command (e.g., DTMF) to the server via the communicator instructing the server to send a vocalized user ID number to the user via the communicator 10 that is to be entered via keypad by the user on the input device of computer 16. Alternatively, the user may press a key on the terminal that generates a string of DTMF tones to the terminal speaker, where the DTMF tones represent a command and a session ID. When the tones are picked up by the communicator microphone they indicate to the server 22 that this session ID is related to the a specific communicator now located near the terminal. The latter method may also be performed manually, with the command and Session ID being displayed on the terminal, prompting the user to press the corresponding keys on the communicator, thus sending DTMF tones to the server indicating to the server that the communicator should be associated with the terminal now controlling the specific session ID.

While the methods and apparatus disclosed herein may or may not have been described with reference to specific hardware or software, the methods and apparatus have been described in a manner sufficient to enable persons of ordinary skill in the art to readily adapt commercially available hardware and software as may be needed to reduce any of the embodiments of the present invention to practice without undue experimentation and using conventional techniques.

While the present invention has been described with reference to a few specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within spirit and scope of the invention.

What is claimed is:

1. A communications system comprising:
   at least one communications network;
   a plurality of communicators connectable to said at least one communications network, each of said communicators being operative to transmit, via said network, audio streams bound from any of said plurality of communicators;
   a plurality of mixers, each mixer including a mixer output, each of said mixer output associated with at least one of said communicators and being operative to:
   receive from said plurality of communicators a plurality of incoming streams bound from said communicators to said mixer;
   transmit any mixed combination of said incoming streams to said communicator associated with said mixer; and
   retransmit a previously-transmitted stream concurrent with any of said mixers currently transmitting a stream not previously transmitted; and
   means for controlling any of said mixers to independently control a volume level of any of said incoming streams being mixed at any of said mixers to create said required mixed combination of said incoming streams.

2. A system according to claim 1 wherein said communicators comprise said means for independently controlling any of said mixers.

3. A system according to claim 1 and further comprising a communications server, said server comprising:
   at least one interface to a communications network, said network being in communication with said communicators;

wherein at least one of said plurality of mixers are located within said server.

4. A system according to claim 1 wherein said communicators are a second system according to claim 1.

5. A system according to claim 1, wherein said means for controlling is operative to control an associated mixer of a first of said communicators to control said volume level of said incoming streams such that said first communicator receives the output stream from said associated mixer, the output being a mix of incoming streams from a second of said communicators at a first volume level and all other of said incoming streams at a second volume level.

6. A system according to claim 1, wherein said means for controlling is operative to control an associated mixer of a first of said communicators to control said volume level of said incoming streams such that said first communicator receives the output stream from said associated mixer, the output being a mix of incoming streams from a second of said communicators at a first volume level only.

7. A system according to claims 5 or 6 wherein said means for controlling is operative to control any of said mixers to control the volume level of said incoming streams such that any other of said communicators other than said first and second communicators do not receive said incoming streams from said first and second communicators.

8. A system according to claim 7, wherein said second communicator only receives said incoming stream from said first communicator.

9. A system according to claims 5 or 6 wherein said means for controlling is operative to control any of said mixers to control the volume level of said incoming streams such that all of said communicators other than said second communicator receives said incoming streams from all of said communicators, and said second communicator only receives said incoming stream from said first communicator.

10. A system according to claim 1 or 3, wherein said means for controlling is operative to connect any of said plurality of communicators to already connected communicators.

11. A system according to claim 1, wherein said mixer is operative to control the volume level of at least one additional incoming stream, according to the input level of any other incoming streams bound for said mixer,
said volume level is set to a first volume level in the absence of any other of said incoming streams bound for said mixer, and
said volume level is set to a second volume level in the presence of any other of said incoming streams bound for said mixer.

12. A system according to claim 11, wherein said mixer is operative to separate any of said input audio streams into a plurality of frequencies and independently control a volume level of any of said frequencies.

13. A system according to claim 1, and further comprising means for reestablishing a connection between one of said communicators connected to said system upon disconnection of said communicator from said system.

14. A system according to claim 1, and further comprising means for reestablishing a connection between one of said communicators connected to said system upon disconnection of said communicator from said system, said means for reestablishing using a list of caller IDs associated with the user of said communicator, such that said list of IDs may contain the caller ID and communicator type last used by an user prior to the disconnection.

15. A system according to claim 1, wherein any of said mixers is operative to receive a text message and further comprises means for converting said text message to an audio message.

16. A system according to claim 1, wherein any of said mixers is operative to receive a pointer to a list consisting of sets including pairs of pre-set text messages, their corresponding audio and graphic representations, such that the pre-recorded message is sent to said communicator and corresponding text message is sent to said controlling means.

17. A system according to claim 16, wherein any of said mixers is operative to receive a pointer to said list and further comprises means for converting said pre-set text message to an audio message and for converting a text message from said controlling means to an audio message.

18. A system according to claim 1, wherein any of said mixers further comprises means for converting any of said audio streams into a text message.

19. A system according to claim 1, wherein said means for controlling is operative to:
prevent an outgoing message from a first of said communicators from being received by any of said mixers.

20. A system according to claim 1, wherein said means for controlling is operative to:
prevent any of said incoming streams from being received by a first of said mixers.

21. A system according to claim 1, wherein said means for controlling is operative to:
prevent an outgoing message from a first of said communicators from being received by any of said mixers, and
prevent any of said incoming streams from being received by a first of said mixers.

22. A system according to claim 1, wherein said means for controlling is operative to prevent any of said communicators from receiving an in-band audio signaling tone sent by any of said communicators.

23. A system according to claim 1, wherein any of said streams are transmitted via any one of a group including voice over IP (VoIP) system, voice over DSL (VoDSL) system and voice over data.

24. A system according to claim 3, wherein
said communicator is operative to cause said server to aurally provide an identification,
said means for controlling is operative to provide said identification to said server upon entry of said identification at said means for controlling, and
said server is operative to associate said communicator with said means for controlling using said identification.

25. A system according to claim 3, wherein
said means for controlling is operative to cause said server to provide an identification,
said communicator is operative to provide said identification to said server upon entry of said identification at said communicator, and
said server is operative to associate said communicator with said means for controlling using said identification.

26. A system according to claim 3, wherein
said means for controlling is operative to cause said server to provide an identification,
said means for controlling is operative to audibly provide in-band signals representing said identification to said communicator,
said communicator is operative to provide said identification to said server, and said server is operative to associate said communicator with said means for controlling using said identification.

27. A system according to claim 1, and further comprising:
   a plurality of microphones connected to one of said communicators, wherein at least one of said microphones is responsive to a far audio field and at least one of said microphones is responsive to a near audio field; and
   a plurality of Automatic Gain Controls (AGC) assembled with input circuitry of said communicator wherein each of said microphones is connected to a separate one of said AGCs, and wherein inputs from both microphones are added via one of said mixers to a microphone input of said communicator.

28. A system according to claim 1, and further comprising:
   a plurality of microphones connected to one of said communicators, wherein at least two of said microphones receive audio input in a different frequency range, and wherein said means for controlling is operative to control said mixers to split said audio stream from said communicator into said different frequency ranges and control a volume level of each of said frequency ranges independently.

29. A system according to claim 1, and further comprising indication means for either of vocally and visually indicating to each user the status of any of said participants.

30. A conferencing communication system comprising:
   at least one communications network over which a plurality of communicators are connectable to said at least one communications network and participate in a telephone conference at a first volume, wherein at least one communicator is also operative to:
      semi-detach from said telephone conference,
      either of receive and initiate a call to an external party while still being able to hear said telephone conference at a second volume level,
      communicate with said external party at a third volume level, and
      upon disconnecting from said external party, re-attach to said telephone conference at any of said volume levels and a fourth volume level;
   a plurality of mixers, each mixer including an output, each of said mixer outputs associated with at least one of said communicators and being operative to:
      receive from said plurality of communicators a plurality of incoming streams bound from said communicators to one of said mixers;
      transmit any mixed combination of said incoming streams to said communicator associated with one of said mixers; and
      retransmit any of said streams concurrent with any of said mixers currently transmitting a stream not previously transmitted; and
   means for controlling any of said mixers to independently control a volume level of incoming streams being mixed at any of said mixers to create a required mixed combination of said incoming streams.

31. A system according to claim 30, and further comprising
   a communications server, said server comprising:
      at least one interface to a communications network, said network being in communication with said communicators;
      wherein at least one of said plurality of mixers are located within said server.

32. A system according to claim 30, wherein said communicators are a second system according to claim 1.

33. A system according to claim 30, wherein said means for controlling is operative to control an associated mixer of a first of said communicators to control said volume level of said incoming streams such that said first communicator receives the output stream from said associated mixer, the output being a mix of incoming streams from a second of said communicators at a first volume level and all other of said incoming streams at a second volume level.

34. A system according to claim 30, wherein said means for controlling is operative to control an associated mixer of a first of said communicators to control said volume level of said incoming streams such that said first communicator receives the output stream from said associated mixer, the output being a mix of incoming streams from a second of said communicators at a first volume level only.

35. A system according to claims 33 or 34 wherein said means for controlling is operative to control any of said mixers to control the volume level of said incoming streams such that any other of said communicators other than said first and second communicators do not receive said incoming streams from said first and second communicators.

36. A system according to claim 35, wherein said second communicator only receives said incoming stream from said first communicator.

37. A system according to claims 33 or 34 wherein said means for controlling is operative to control any of said mixers to control the volume level of said incoming streams such that all of said communicators other than said second communicator receives said incoming streams from all of said communicators, and said second communicator only receives said incoming stream from said first communicator.

38. A system according to claim 30 or 31, wherein said means for controlling is operative to connect any of said plurality of communicators to already connected communicators.

39. A system according to claim 30, wherein said mixer is operative to control the volume level of at least one additional incoming stream, according to the input level of any other incoming streams bound for said mixer,
   said volume level is set to a first volume level in the absence of any other of said incoming streams bound for said mixer, and
   said volume level is set to a second volume level in the presence of any other of said incoming streams bound for said mixer.

40. A system according to claim 39, wherein said mixer is operative to separate any of said input audio streams into a plurality of frequencies and independently control a volume level of any of said frequencies.

41. A system according to claim 30, and further comprising means for reestablishing a connection between one of said communicators connected to said system upon disconnection of said communicator from said system.

42. A system according to claim 30, and further comprising means for reestablishing a connection between one of said communicators connected to said system upon disconnection of said communicator from said system, said means for reestablishing using a list of caller IDs associated with the user of said communicator, such that said list of IDs may contain the caller ID and communicator type last used by an user prior to the disconnection.

43. A system according to claim 30, wherein any of said mixers is operative to receive a text message and further comprises means for converting said text message to an audio message.

44. A system according to claim 30, wherein any of said mixers is operative to receive a pointer to a list consisting of sets including pairs of pre-set text messages, their corresponding audio and graphic representations, such that the pre-recorded message is sent to said communicator and corresponding text message is sent to said controlling means.

45. A system according to claim 44, wherein any of said mixers is operative to receive a pointer to said list and further comprises means for converting said pre-set text message to an audio message and for converting a text message from said controlling means to an audio message.

46. A system according to claim 30, wherein any of said mixers further comprises means for converting any of said audio streams into a text message.

47. A system according to claim 30, wherein said means for controlling is operative to:

prevent an outgoing message from a first of said communicators from being received by any of said mixers.

48. A system according to claim 30, wherein said means for controlling is operative to:

prevent any of said incoming streams from being received by a first of said mixers.

49. A system according to claim 30, wherein said means for controlling is operative to:

prevent an outgoing message from a first of said communicators from being received by any of said mixers, and prevent any of said incoming streams from being received by a first of said mixers.

50. A system according to claim 30, wherein said means for controlling is operative to prevent any of said communicators from receiving an in-band audio signaling tone sent by any of said communicators.

51. A system according to claim 30, wherein any of said mixers is operative to retransmit any of said previously-transmitted streams.

52. A system according to claim 30, wherein any of said streams are transmitted via any one of a group including voice over IP (VoIP) system, voice over DSL (VoDSL) system and voice over data.

53. A system according to claim 31, wherein said communicator is operative to cause said server to aurally provide an identification, said means for controlling is operative to provide said identification to said server upon entry of said identification at said means for controlling, and said server is operative to associate said communicator with said means for controlling using said identification.

54. A system according to claim 31, wherein said means for controlling is operative to cause said server to provide an identification, said communicator is operative to provide said identification to said server upon entry of said identification at said communicator, and said server is operative to associate said communicator with said means for controlling using said identification.

55. A system according to claim 31, wherein said means for controlling is operative to cause said server to provide an identification, said means for controlling is operative to audibly provide in-band signals representing said identification to said communicator, said communicator is operative to provide said identification to said server, and said server is operative to associate said communicator with said means for controlling using said identification.

56. A system according to claim 30, and further comprising:

a plurality of microphones connected to one of said communicators. wherein at least one of said microphones is responsive to a far audio field and at least one of said microphones is responsive to a near audio field, and a plurality of Automatic Gain Controls (AGC) assembled with input circuitry of said communicator wherein each of said microphones is connected to a separate one of said AGCs, and wherein inputs from both microphones are added via one of said mixers to a microphone input of said communicator.

57. A system according to claim 30, and further comprising:

plurality of microphones connected to one of said communicators, wherein at least two of said microphones receive audio input in a different frequency range, and wherein said means for controlling is operative to control said mixers to split said audio stream from said communicator into said different frequency ranges and control a volume level of each of said frequency ranges independently.

58. A system according to claim 30, and further comprising indication means for either of vocally and visually indicating to each user the status of any of said participants.

59. A system according to claim 51, wherein any of said mixers is operative to retransmit any of said previously-transmitted streams at a first retransmission speed concurrently with a currently-transmitted stream at a different speed than said first transmission speed.

60. A system according to claim 1, wherein each of said mixers comprises means for converting incoming audio streams into a common audio format compatible with its associated communicator.

61. A system according to claim 30, wherein each of said mixers comprises means for converting incoming audio streams into a common audio format compatible with its associated communicator.

* * * * *